United States Patent
Wait

(10) Patent No.: US 10,676,106 B2
(45) Date of Patent: Jun. 9, 2020

(54) TRAIN CONTROL SYSTEM INTEGRATION INTO LOCOMOTIVES HAVING DISTRIBUTED POWER

(71) Applicant: NEW YORK AIR BRAKE, LLC, Watertown, NY (US)

(72) Inventor: Keith Wait, Flower Mound, TX (US)

(73) Assignee: New York Air Brake, LLC, Watertown, NY (US)

( * ) Notice: Subject to any disclaimer, the term of this patent is extended or adjusted under 35 U.S.C. 154(b) by 2 days.

(21) Appl. No.: 15/886,999

(22) Filed: Feb. 2, 2018

(65) Prior Publication Data

US 2018/0215397 A1 Aug. 2, 2018

Related U.S. Application Data

(60) Provisional application No. 62/453,599, filed on Feb. 2, 2017.

(51) Int. Cl.
*B61C 17/12* (2006.01)
*B61L 15/00* (2006.01)

(52) U.S. Cl.
CPC ............ *B61C 17/12* (2013.01); *B61L 15/009* (2013.01); *B61L 15/0036* (2013.01); *B61L 15/0063* (2013.01); *B61L 15/0072* (2013.01); *B61L 15/0081* (2013.01)

(58) Field of Classification Search
None
See application file for complete search history.

(56) References Cited

U.S. PATENT DOCUMENTS

| | | | | |
|---|---|---|---|---|
| 2005/0113988 A1* | 5/2005 | Nasr | ...................... | A62C 27/00 701/22 |
| 2011/0284699 A1* | 11/2011 | Cooper | ..................... | B61L 3/20 246/28 R |
| 2011/0284700 A1* | 11/2011 | Brand | .................. | B61L 15/0036 246/28 R |
| 2014/0114507 A1* | 4/2014 | Kernwein | ............... | B61L 3/008 701/19 |
| 2015/0200712 A1* | 7/2015 | Cooper | ..................... | H04B 3/54 375/257 |
| 2015/0217790 A1* | 8/2015 | Golden | ............... | B61L 15/0072 701/19 |
| 2016/0359741 A1* | 12/2016 | Cooper | ................... | B61C 17/12 |

* cited by examiner

*Primary Examiner* — Thomas G Black
*Assistant Examiner* — Demetra R Smith-Stewart
(74) *Attorney, Agent, or Firm* — David L. Nocilly; Bond Schoeneck & King, PLLC

(57) ABSTRACT

A train control system that can be integrated into a locomotive having a distributed power mode. The train control system includes a router interposed in a communication link between the locomotive computer and the distributed power module that is responsible for telling the locomotive computer whether distributed power mode is active or inactive. The train control system controls the router to obtain any locomotive operational data sent from the locomotive computer to the distributed power module for use by the train control system. The router may additionally intercept and block communications from the distributed power module to the locomotive computer and replace the communications with messages that cause the locomotive computer to provide locomotive operational data that is would not otherwise output in a particular distributed power state.

2 Claims, 5 Drawing Sheets

TRAIN CONTROL SYSTEM INTEGRATION INTO LOCOMOTIVES HAVING DISTRIBUTED POWER

CROSS-REFERENCE TO RELATED APPLICATIONS

The present application claims priority to U.S. Provisional Application No. 62/453,599, filed on Feb. 2, 2017

BACKGROUND OF THE INVENTION

1. Field of the Invention

The present invention relates to train control systems and, more specifically, to the integration of a train control system into a distributed power locomotive.

2. Description Of The Related Art

Train control/energy management systems for locomotives, such as the LEADER® system available from New York Air Brake of Watertown, N.Y., are designed to improve train handling and yield significant fuel savings. These systems assist locomotive engineers in reducing fuel consumption while effectively managing trip time and minimizing in-train forces. The on-board electronic equipment of these systems capture, store, and report real-time data collected as the train works in normal operation, and include a cab display that shows train dynamics in real time as the train moves across the territory. These cab displays may provide the engineer with a wide range of information including track topology, train trajectory, real-time status of trail and remote locomotives in the locomotive consist, brake system status, and in-train forces. More importantly, these system are used to predict the train dynamics on a forward looking basis to optimize the train handling with respect to in-train forces, fuel economy, standard operating practices, and time to destination.

Integration of a train control system into a locomotive can be difficult as the train control system needs to have access to the information necessary for performing its functions. For example, in some operating states, the onboard locomotive computer may not transmit status data in a way that the train control system can capture the required information. Accordingly, there is a need in the art for an approach for integrating a train control system into the locomotive control equipment in a manner that ensures that all of the information needed by the train control system will be available regardless of the particular operating state of the locomotive.

BRIEF SUMMARY OF THE INVENTION

The present invention is an approach for integrating a train control system into a locomotive that enables the train control system to obtain the data needed for its functioning from the communications that take place between a locomotive computer and an associated distributed power control module. The invention comprises the use of a router under the control of the train control system that can observe the locomotive computer and distributed power module communications to obtain the necessary data in certain circumstances, or intercept and manipulate communications to cause the locomotive computer to report information that is would not otherwise provide in other circumstances.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
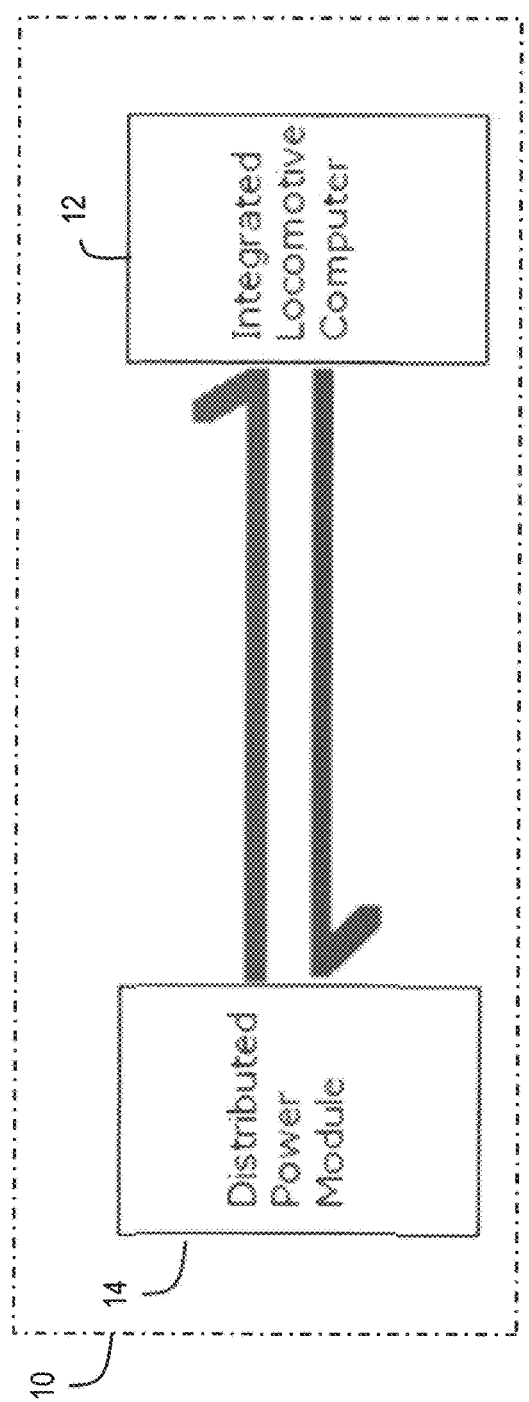
FIG. 1 is a schematic of communications among locomotive equipment in a distributed power scenario.

Referring to the figures, wherein like numerals refer to like parts throughout, there is seen in FIG. 1 a locomotive 10 having an integrated locomotive computer (ILC/IFD/OIM) 12 that is in communication with a distributed power module (IPM) 14. As in known in the art, distributed power module 14 facilitates coordinated braking and traction power distribution among lead and remote locomotives in a train. In a locomotive having distributed power capabilities, communications are limited to those seen in FIG. 1 and the installation of a train control system requires the additional installation of equipment that can separately collect and provide the data necessary for the train control system to perform its functions as the requisite locomotive status data is not always broadcast by a particular locomotive computer 12.

When locomotive 10 is not operating in a distributed power mode, locomotive computer 12 will periodically (0.2 Hz) send a distributed power status message to the ILC that indicates that distributed power is "disabled." When locomotive 10 is operating with distributed power enabled, locomotive computer 10 will more frequently (1 Hz) send a distributed power status message that indicates that distributed power is "enabled." Once the procedure of linking a lead locomotive with a remote locomotive is completed, the distributed power status message will also indicate that linking has occurred. When distributed power is enabled, locomotive computer 12 will additionally send a control status message to distributed power module 14 that indicates the control status of locomotive 10. The control status message is used for synchronous operations where remote locomotives in the train will follow the commands sent by a lead locomotive and thus contains data about the current state of locomotive that can be used by train control system 16 in lieu of external sensing equipment.

Figure 2:
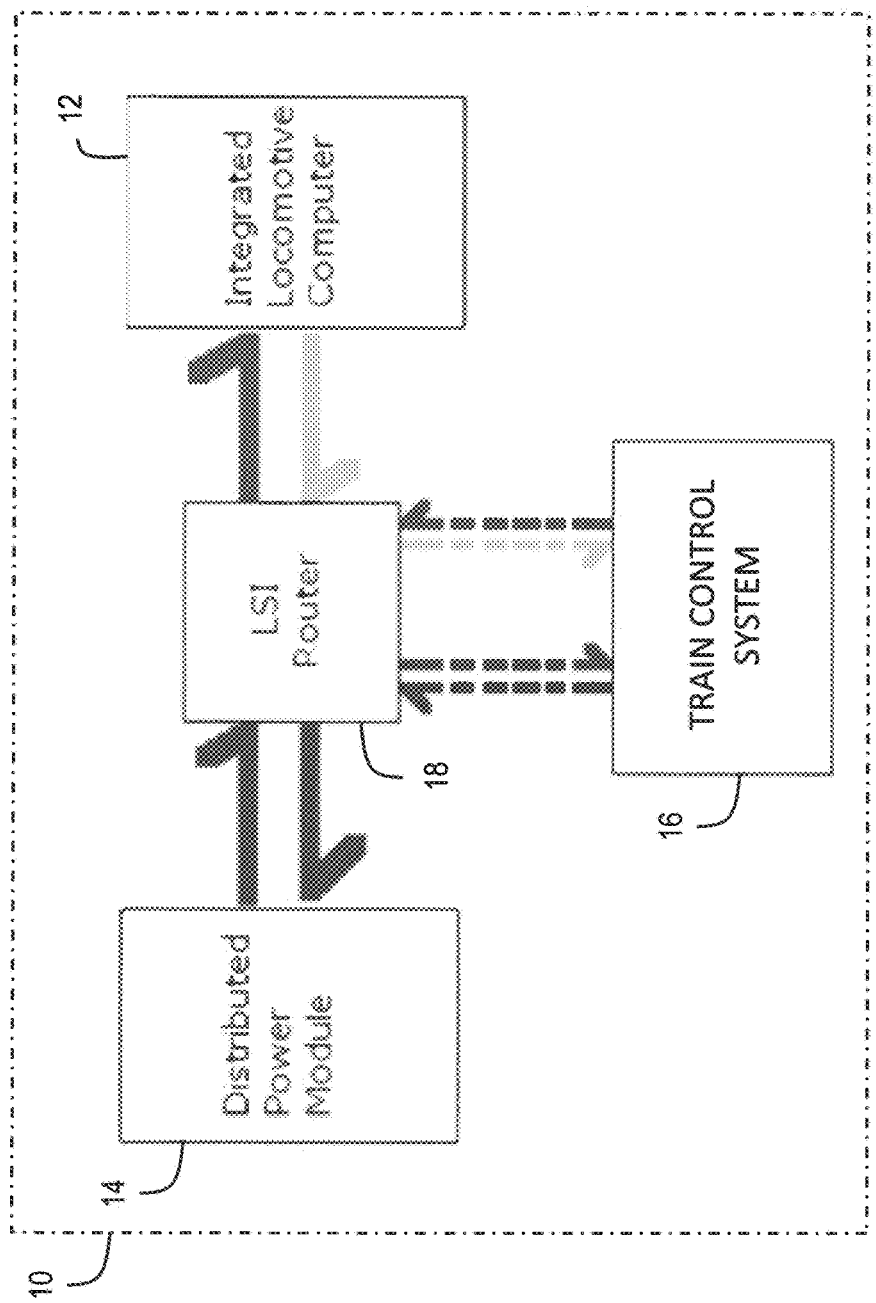
FIG. 2 is a first schematic of an approach for integrating a train control system with locomotive equipment that may engaged in a distributed power scenario.

Referring to FIG. 2, a train control system 16 may be interfaced with a locomotive 10 by interposing a router 18 in the synchronous RS-422 (LSI) communication path used to connect locomotive computer 12 with distributed power module 14. Train control system 16 can configure LSI router 18 to perform operations with respect to the traffic between locomotive computer 12 and distributed power module 14. For example, train control system 16 can simply observe the traffic. Train control system 16 can also command router 18 to send new traffic to locomotive computer 12 or distributed power module 14 so that it appears to have come from the other. Train control system 16 can also command router 18 to block certain communications sent by one of locomotive computer 12 and distributed power module 14 to the other. Train control system 16 can further command router 18 to modify the communications sent by one of locomotive computer 12 and distributed power module 14 to the other to change the content of the communications.

As seen in FIG. 2, LSI router 18 is configured to include a supervisory mode of operation in which LSI communication path 18 remains unbroken, i.e., all communication traffic can flow between locomotive computer 12 with distributed power module 14, and all communication traffic sent over the LSI connection is additionally forwarded to a third party host, such as a train control system 16. LSI router 18 is preferably operating in this mode when locomotive 10 is in a distributed power enabled state such that locomotive computer 12 is transmitting locomotive operation data that train control system 10 can use for its train control functions.

Figure 3:
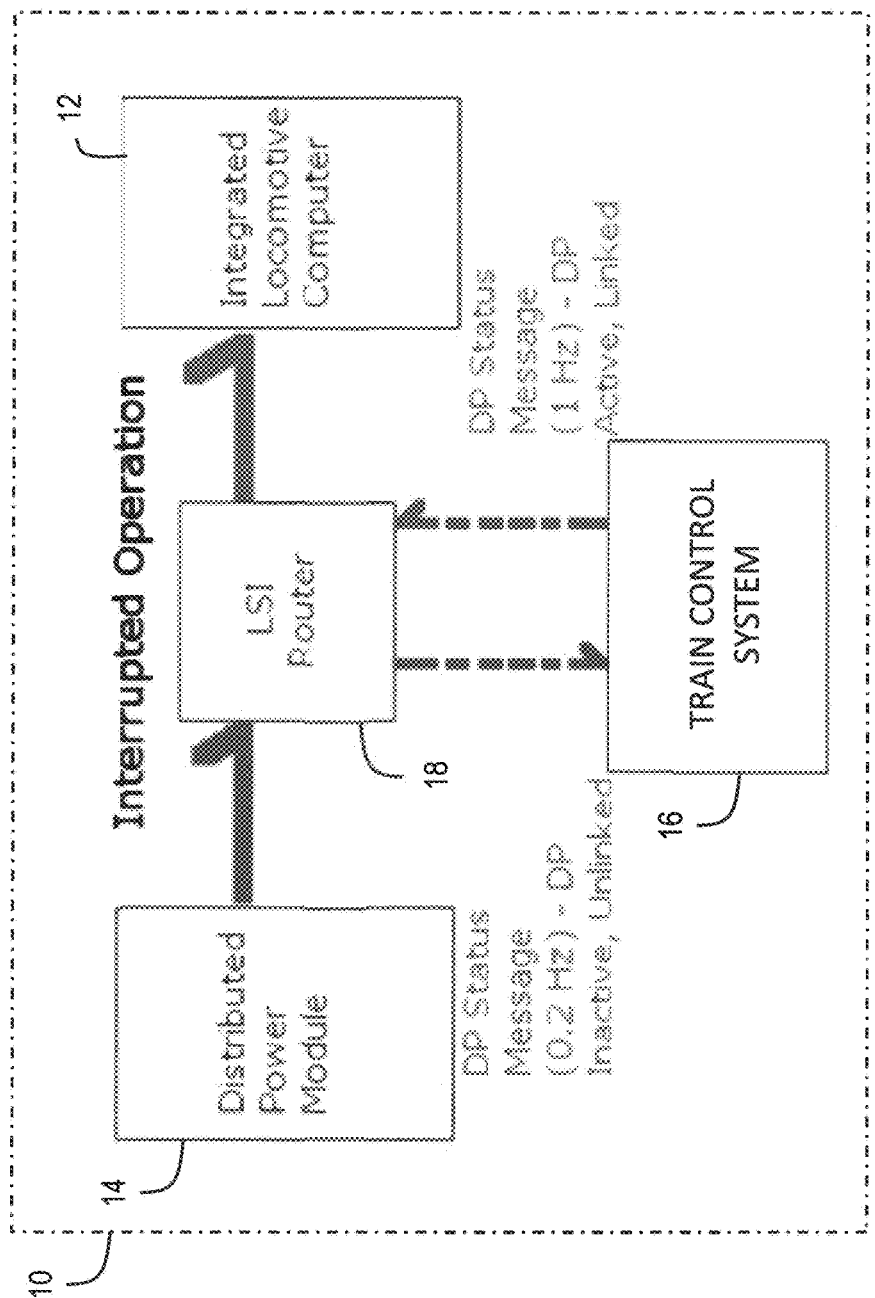
FIG. 3 is a second schematic of an approach for integrating a train control system with locomotive equipment that may engaged in a distributed power scenario.
Figure 4:
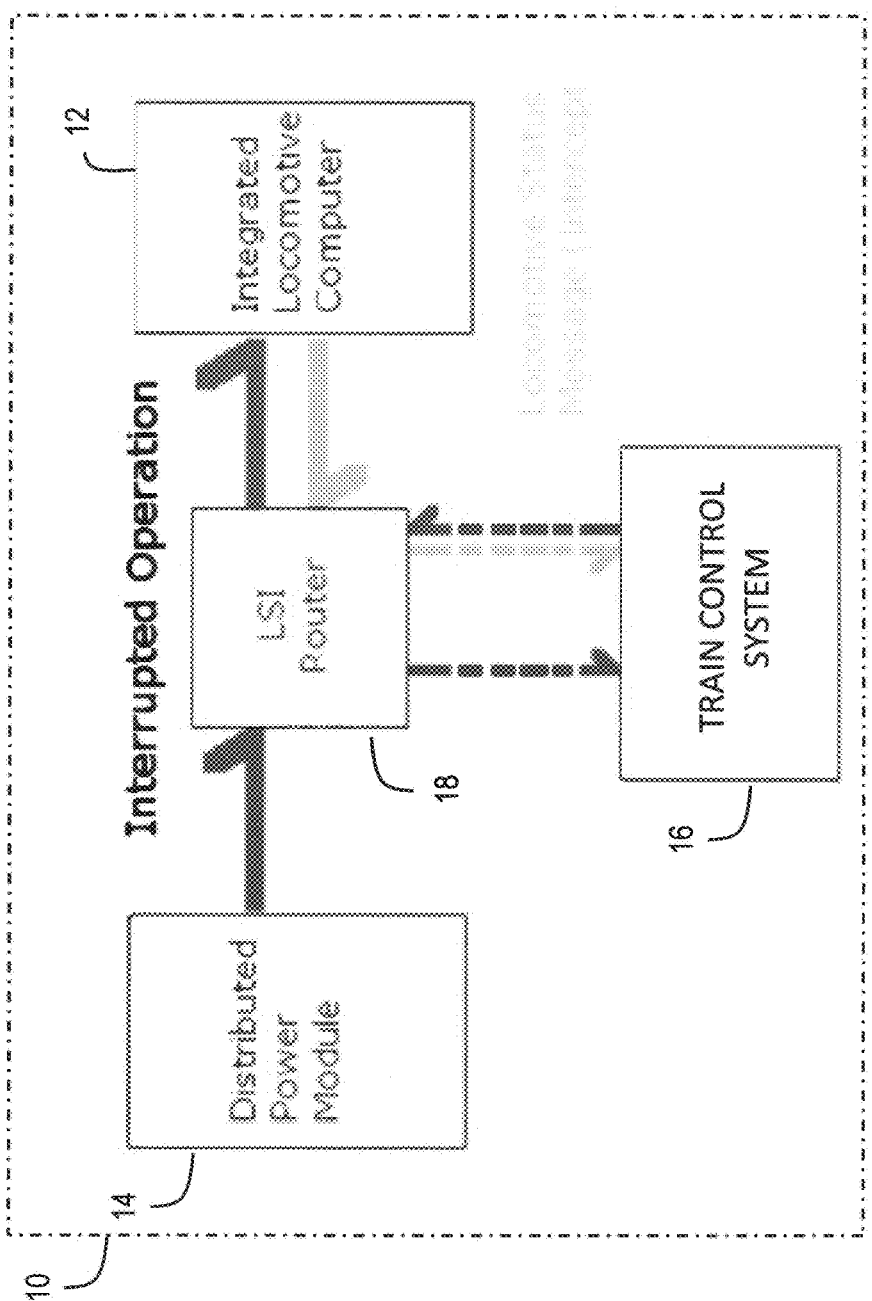
FIG. 4 is a third schematic of an approach for integrating a train control system with locomotive equipment that may engaged in a distributed power scenario.
Figure 5:
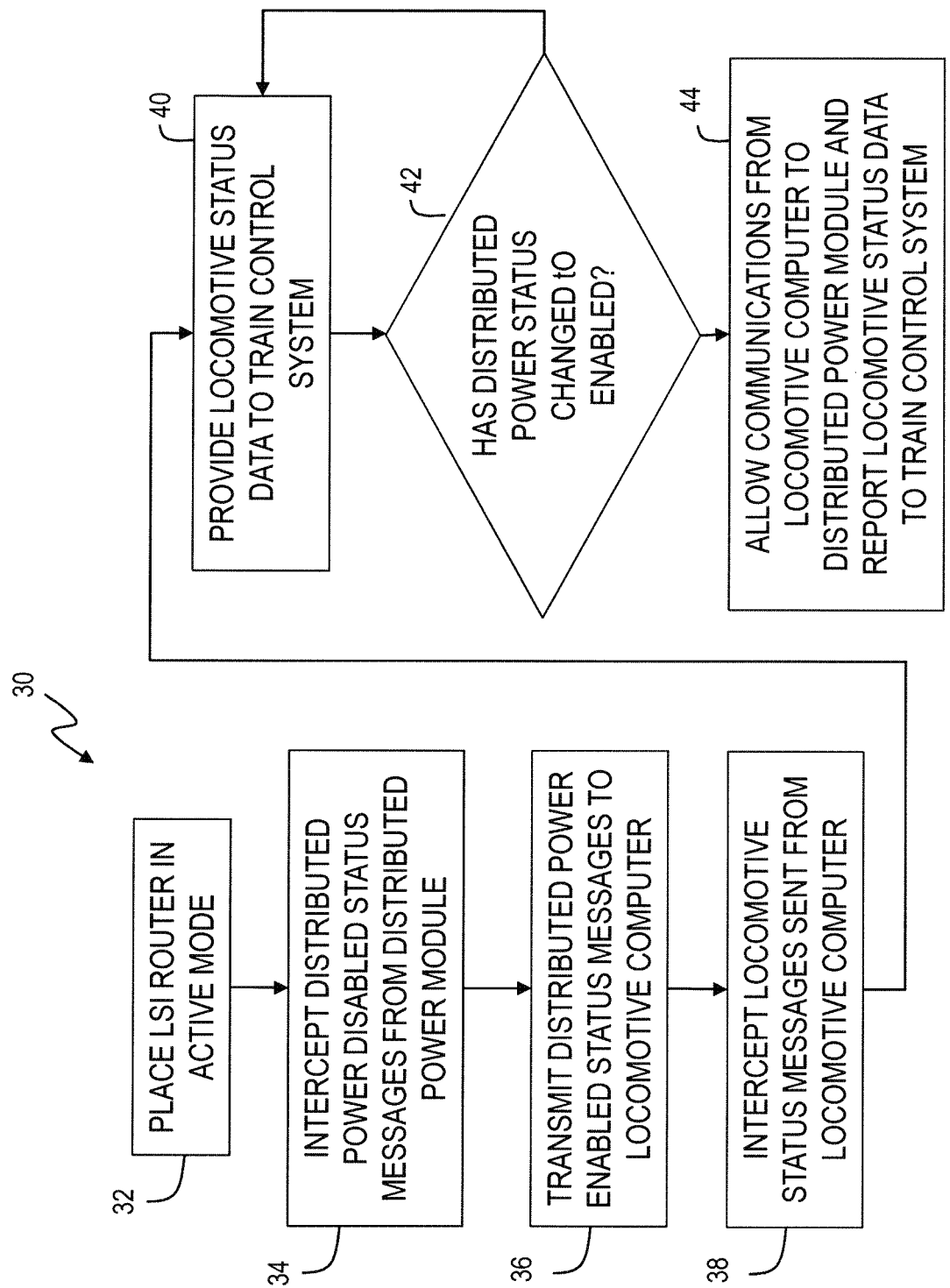
FIG. 5 is a flowchart of a router control process for integrating a train control system with locomotive equipment.

Referring to FIG. 3, LSI router 18 may include an interrupted mode of operation where the connection between locomotive computer 12 and distributed power module 14 is blocked so that communication traffic will not flow between locomotive computer 12 and distributed power module 14 unless allowed to do so by LSI router 18. LSI router 18 preferably uses this mode when distributed power module 16 is broadcasting that distributed power is not enabled. As locomotive computer 12 would not normally provide control status messages with the locomotive status information that can be used by train control system 16 when distributed power is not enabled, LSI router 18 blocks transmission of the message indicating distributed power is not enabled. LSI router 18 then instead transmits a message to locomotive computer 12 that distributed power is enabled (and repeats the message as required by the particular distributed power system to maintain the fiction that distributed powers is enabled). As a result, locomotive computer 12 is triggered to transmit the locomotive status data that can be used by train control system 16 for its functionality that it would not have ordinarily been providing on a regular basis when in the inactive distributed power state. As seen in FIG. 4, LSI router 18 can also block transmission of the locomotive status data sent from locomotive computer 12 to distributed power module 14 so that the requisite data is received by train control system 16 but distributed power module 14 does not receive conflicting messages from locomotive computer 12.

Train control system 16 is programmed to implement a router control process 30 that commences with the step of placing LSI router 18 into an active mode 32. Next, LSI router 18 is commanded to begin intercepting distributed power status messages 34, such as those sent from distributed power module 14 to locomotive computer 12 that indicate that distributed power is disabled. At the required rate (e.g., 1 Hz), LSI router 18 is then commanded to transmit distributed power status messages 36 to locomotive computer 12 indicating that distributed power is enabled and that a link between lead and remote locomotives exists (which is not actually true). Next, LSI router 18 is commanded to intercept all locomotive status messages sent by locomotive computer 12 to distributed power module 14. LSI router 18 is then commanded to provide the locomotive status data in the locomotive status messages to train control system 16 for use by train control system 16 in performing its train control analysis and functionality 40. Thus, router control process 30 prompts locomotive computer 12 to send the locomotive status data that is needed by train control system 16 in circumstances when the data would otherwise not be sent by locomotive computer 12. Finally, router control module should monitor the intercepted distributed power status messages to check whether a change in the distributed power status has been commanded 42. If so, LSI router 18 can transition to a passive mode where it simply allows communications between locomotive computer 12 and distributed power module 14 and reports locomotive status information in those communications to train control system 10. Router control process 30 may implemented in a discrete module programmed into train control system 16, in the general programming of train control system 16, or as separate firmware or hardware associated with train control system 16.

It should be recognized that other traffic between locomotive computer 12 and distributed power module 14 may need to be intercepted or injected into communication stream. For example, in a distributed power system that requires a second or any number of additional status messages to be present and periodically transmitted when distributed power is enabled and linked, router control module of train control system 16 may need to populate these messages with dummy or appropriate data to allow locomotive 10 to function normally. Similarly, router control module of train control system 16 may need to intercept any additional distributed power messages that locomotive computer 12 is stimulated to send but not expected or required by distributed power module 14.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A train control system, comprising:
    a router configured for interconnection to a communication link extending between a locomotive computer and a distributed power module; and
    a router control module interconnected and programmed to operate the router, wherein the control module is programmed to cause the router to transmit any locomotive operational data sent from the locomotive computer to the distributed power module to the control module for use by the train control system, to cause the router to intercept and block a communication from the distributed power module to the locomotive computer, and to send a communication to the locomotive computer that has the appearance of originating from the distributed power module.

2. The system of claim 1, wherein the control module is programmed to cause the router to intercept and block a communication from the locomotive computer to the distributed power module.

* * * * *